MAGNETIC TAPE RECORD EDITING APPARATUS

Filed Feb. 25, 1965

Inventors
HUGH S. LEMAN
GEORGE J. P. BARNES
JOHN U. GREEN
By Percy P. Lantzy
Attorney 3,440,362

MAGNETIC TAPE RECORD EDITING APPARATUS

Hugh Spence Leman, George John Preston Barnes, and John Uvedale Green, London, England, assignors to International Standard Electric Corporation, New York, N.Y., a corporation of Delaware Filed Feb. 25, 1965, Ser. No. 435,372
Claims priority, application Great Britain, Mar. 12, 1964, 10,469/64
Int. Cl. G11b 27/02, 5/06
U.S. Cl. 179—100.2 7 Claims

ABSTRACT OF THE DISCLOSURE

A magnetic tape record editing apparatus wherein a stationary tape is held in contact with a rotating drum and the beginning and the end of a defective portion of the tape is marked by controlling variably timed pulses which in turn control a switch having as input signals the output of a magnetic record/playback head, and either an erase signal or correct data from another tape which is to be inserted into the isolated portion of the tape.

Figures 1, 2, 3:
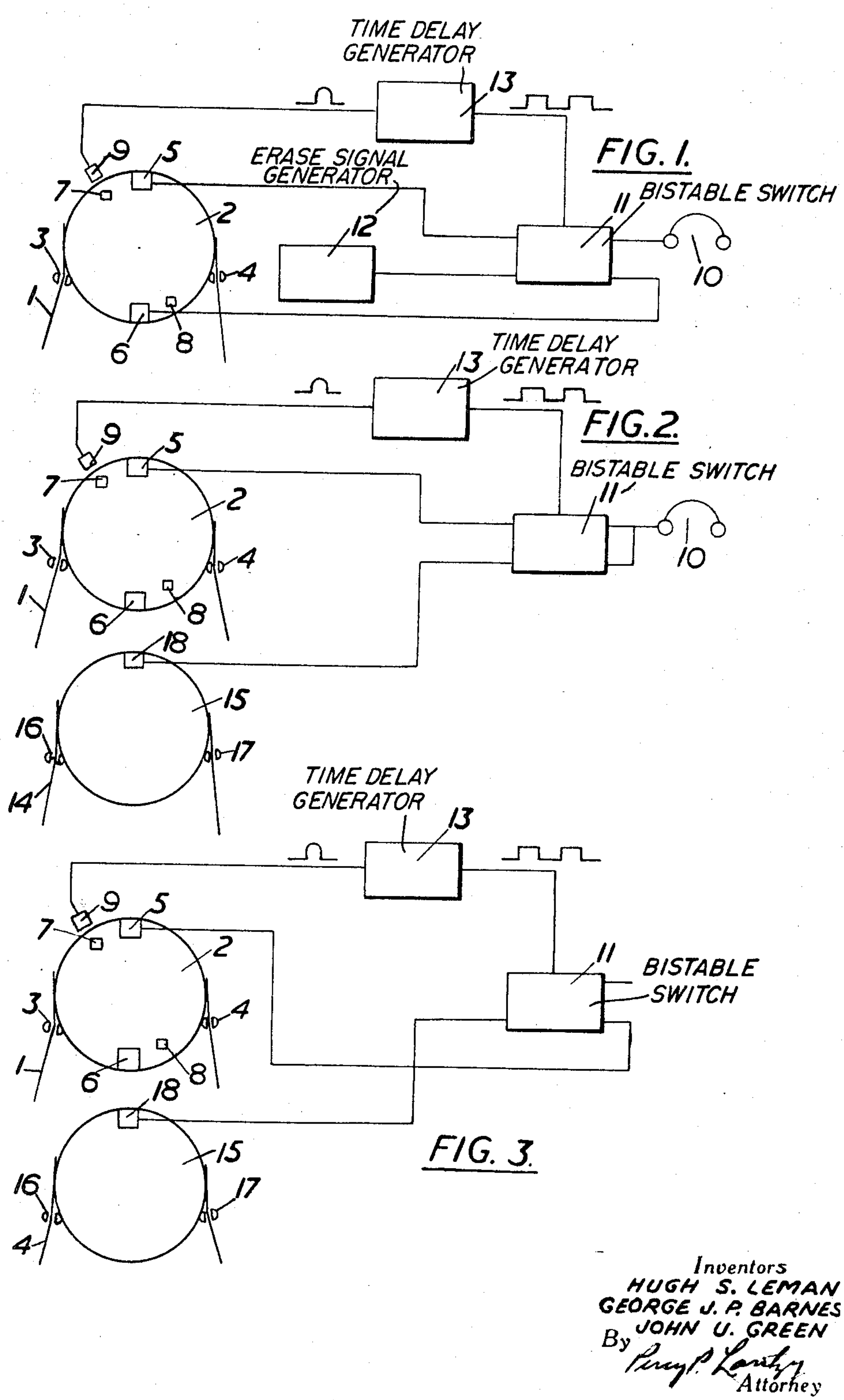

This invention relates to magnetic tape handling apparatus, and particularly to apparatus for editing recorded tape.

According to one aspect of the invention there is provided magnetic tape record editing apparatus including means for repetitively magnetically scanning a selected length of the recorded tape including a portion to be edited, means for deriving signals indicative of the commencement and the end of said portion to be edited, and means under control of said signals for automatically effecting the desired editing, such as erasure of the said portion.

According to another aspect of the invention there is provided magnetic tape record editing apparatus provided with repetitive tape scanning means, which scanning means comprises a rotating disc with a magnetic record/playback head mounted in its periphery so as to magnetically scan the tape when a selected length of the recorded tape including a portion to be edited is wrapped around said disc, the tape being held stationary, and means for deriving signals indicative of the commencement and the end of said portion to be edited.

An embodiment of the invention will now be described with reference to the accompanying drawings, in which FIGS. 1 to 3 illustrate successive stages of operation of a tape editing apparatus shown in schematic form.

Referring to FIG. 1 a recorded tape 1 is partly wrapped around a rotatable disc 2. The length of the tape 1 around the disc 2 is arranged to contain a selected length of tape known to contain a portion to be edited, i.e. this particular length of tape contains an unwanted sound or sounds which it is desired to remove or replace with a correct sound or sounds.

The angle of wrap is variable by the setting of adjustable tape guides 3 and 4. The disc 2 has a record/playback head 5 in its periphery for magnetically scanning the tape 1, and an erase head 6 in its periphery diametrically opposed to the head 5.

On the disc 2 are two ferromagnetic markers 7 and 8 diametrically opposed to one another and each arranged to co-operate with a stationary magnetically responsive coil 9 which generates a pulse each time the markers 7 and 8 pass adjacent to it. This causes a reference pulse to be generated at every 180° of revolution of the disc when the disc is rotating, and the tape is so mounted on the disc that this reference pulse occurs before the faulty recorded section of the tape.

With the tape 1 held stationary, the length of wrapped tape is repetitively scanned by the head 5 on the rotating disc and the recording listened to by means of headphones 10 connected to the head 5 via an electronic changeover switch 11 capable of passing the range of speech or music frequencies such as are encountered in tape recordings. The switch 11 has two paths, one being on when the other is off and vice versa. One path is to connect the head 5 to the headphones 10 and the other path is to connect an erase generator 12 to the erase head 6.

Each reference pulse activates a first time delay circuit in a time delay generator 13 which is adjusted to open the path via the switch 11 between the head 5 and the headphones 10 at the beginning of the section to be erased. A second time delay circuit in the time delay generator 13, operated either from the reference pulse or the output from the first time delay circuit, is adjusted to re-close the path via the switch 11 between the head 5 and the headphones 10.

This adjustment is carried out while listening to the repetitively scanned tape on the headphones 10, so that when the correct adjustment has been made, successive scanning of the tape causes operation of the switch 11 such that the offending portion is no longer heard in the headphones 10, although this section still exists on the tape.

Having obtained this setting of the adjustable delay circuits so that the offending section is no longer heard in the headphones, the erase generator 12 is energized, and the switch 11 at its next changeover under control of the delayed pulses following a reference pulse generated by the erase head marker 8 allows an erase signal to pass to the erase head 6 to erase the unwanted section on the tape 1.

Such removal by erasure of an unwanted sound or sounds from a recorder tape in this manner, such sound being, for example, of a cough or a door banging in an orchestral recording, will produce a gap in the recording which will not be noticed unless it exceeds several hundred milliseconds. It may, however, be required to replace an erased section with a correct recording, for example, in an orchestral recording containing a false note. In this case, simply to erase the false note will not suffice.

In order to record a true note or passage in the place of a false note or passage removed by the method already described, a second tape recording is required which includes the true note or passage to be re-recorded. This second tape 14 is mounted on a second rotating disc 15 (FIG. 2) having adjustable tape guides 16 and 17 and equipped with a record/playback head 18 its periphery, and synchronized with the first rotating disc 2. Conveniently the second disc is mounted on the same drive shaft as the first disc.

The second tape 14 is repetitively scanned and adjusted until it is synchronized with the first tape 1. The second head 18 is connected to the switch 11 in place of the erase generator 12, and the output from this path of the switch 11 is now connected to the headphones 10. Thus by listening at the headphones 10, and with the switch changeover settings i.e. the delay circuit settings, already determined by the erasure procedure, the second tape 14 is adjusted on the disc 15 until, on the cutting out of the offending section in the first tape 1 this is substituted by the correct section from the second tape 14 during the change-over period of the switch 11.

Once this has been achieved, on a subsequent scan the correct section on the second tape is routed through the switch 11 (FIG. 3) to the head 5 on the first disc 2 and is recorded in the gap in the first tape 1.

The original tape now has the offending section corrected.

The reference pulse may be, for example, an optical or an electrostatic pulse instead of magnetic.

The record/playback head and erase head may be combined in a single head, in which case only a single reference pulse per revolution would be required.

It is to be understood that the foregoing description of specific examples of this invention is made by way of example only and is not to be considered as a limitation on its scope.

What we claim is:

1. A magnetic tape record editing apparatus comprising:
- a member cyclically moveable with respect to said tape,
- a record/playback head mounted on said member,
- means for generating a reference pulse each time said member passes through a given position, said means including an element carried on the aforesaid member,
- means responsive to each of said reference pulses for producing a pair of pulses, the first occurring at a selected time after the reference pulse and the second occurring at a selected time after the first of the pair of pulses,
- an output device coupled to the record/playback head, and
- switching means responsive to one of the pair of the aforesaid pulses for disconnecting the output device from the record/playback head and further responsive to the other of the pair of pulses for reconnecting the output device to the record/playback head.

2. A magnetic tape record editing apparatus according to claim 1 wherein the member cyclically moveable with respect to the tape comprises a rotating member.

3. A magnetic tape record editing apparatus according to claim 1 wherein said generating means comprises:
- at least one ferromagnetic marker mounted on said member, and
- a stationary magnetically responsive coil.

4. A magnetic tape record editing apparatus according to claim 1, further including an erase head mounted on said member.

5. A magnetic tape record editing apparatus according to claim 4 further including:
- an erase signal generator,
- said switching means including means providing a path for the erase signal from the erase generator to the erase head when said switching means has disconnected the output device from the record-playback head.

6. A magnetic tape record editing apparatus according to claim 1 further including:
- a source of correction data,
- said switching means further including means for coupling said source to said output device when the record/playback head is disconnected from the output device.

7. A magnetic tape record editing apparatus according to claim 1 further including:
- a source of correction data,
- said switching means further including means for coupling said source of said head when the record/playback head is disconnected from the output device.

References Cited

UNITED STATES PATENTS

| | | | |
|---|---|---|---|
| 2,558,853 | 7/1951 | Kappeler | 179—100.2 |
| 3,031,534 | 4/1962 | Trumble | 179—100.2 |
| 3,075,049 | 1/1963 | Gordon et al. | 179—100.2 |
| 3,317,680 | 5/1967 | Porter | 179—100.2 |

BERNARD KONICK, *Primary Examiner.*

J. R. GOUDEAU, *Assistant Examiner.*